United States Patent [19]

Hartness et al.

[11] Patent Number: 4,545,173
[45] Date of Patent: Oct. 8, 1985

[54] APPARATUS FOR SECURING CARTONS ON THE TOP OF ARTICLES CARRIED IN A CASE

[76] Inventors: Thomas S. Hartness, Rte. 12, Paris Mountain, Greenville, S.C. 29609; Thomas P. Hartness, Rte. 2, Smith Dr., Greenville, S.C. 29067

[21] Appl. No.: 467,020

[22] Filed: Feb. 16, 1983

Related U.S. Application Data

[62] Division of Ser. No. 205,194, Nov. 10, 1980, Pat. No. 4,392,586.

[51] Int. Cl.$^4$ .................... B65B 21/00; B65B 27/04
[52] U.S. Cl. ........................................ 53/48; 53/202
[58] Field of Search ............... 53/48, 314, 315, 202, 53/313, 367

[56] References Cited

U.S. PATENT DOCUMENTS

| | | |
|---|---|---|
| 3,859,773 | 1/1975 | Calvert et al. ................... 53/48 |
| 3,867,807 | 2/1975 | Doucette .......................... 53/48 |
| 3,877,198 | 4/1975 | Vergobbi .......................... 53/48 |
| 3,977,150 | 8/1976 | Culpepper ...................... 53/48 X |
| 4,231,209 | 11/1980 | Walker et al. ................. 53/314 X |
| 4,287,699 | 9/1981 | Hart ................................. 53/48 |

Primary Examiner—Horace M. Culver
Attorney, Agent, or Firm—Dority & Manning

[57] ABSTRACT

A device for feeding cartons in succession from a stack of cartons for being deposited on top of articles carried in a case being moved on a conveyor. A plurality of picker fingers are selectively moved to and from the stack of cartons, and outwardly extending projections carried on top of the picker fingers extend between the lowermost carton and the next carton. Upon lowering of the picker fingers, the lowermost cartons of the stack are deposited on a feed chute for delivery to the case. The case is moved along the conveyor under a pressure foot which presses the cartons down over the tops of the articles for securing the articles in packages.

7 Claims, 18 Drawing Figures

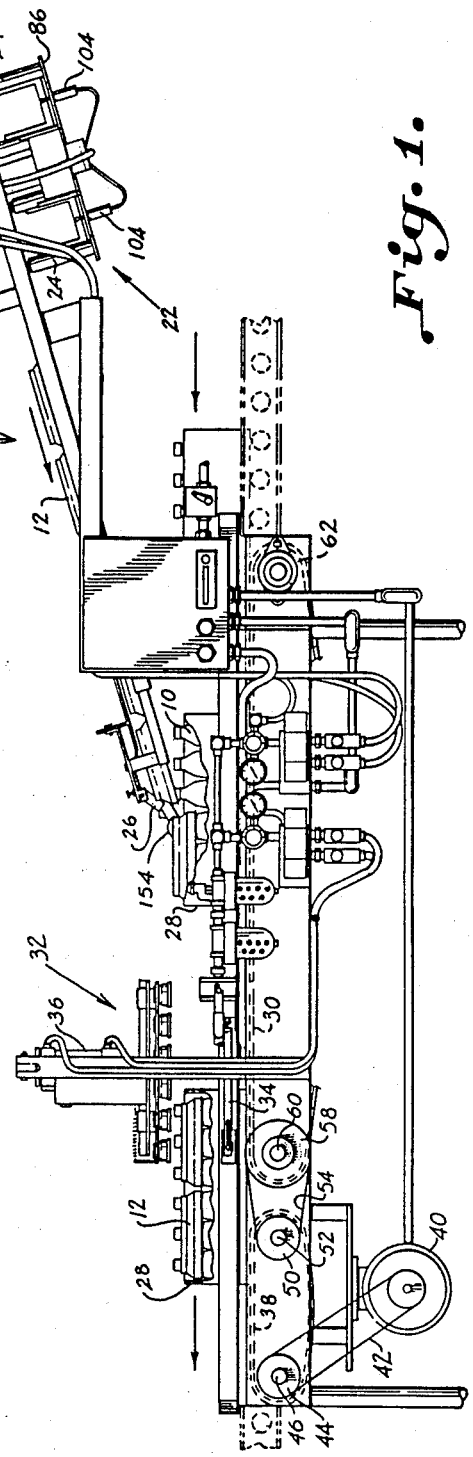
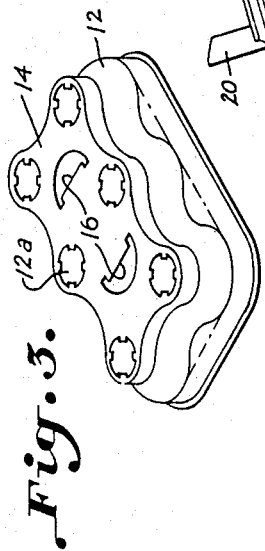
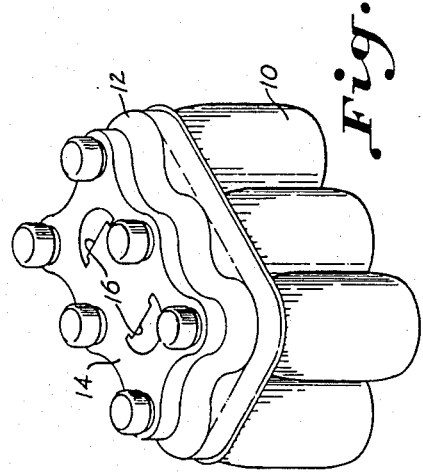
Fig. 1.
Fig. 2.
Fig. 3.

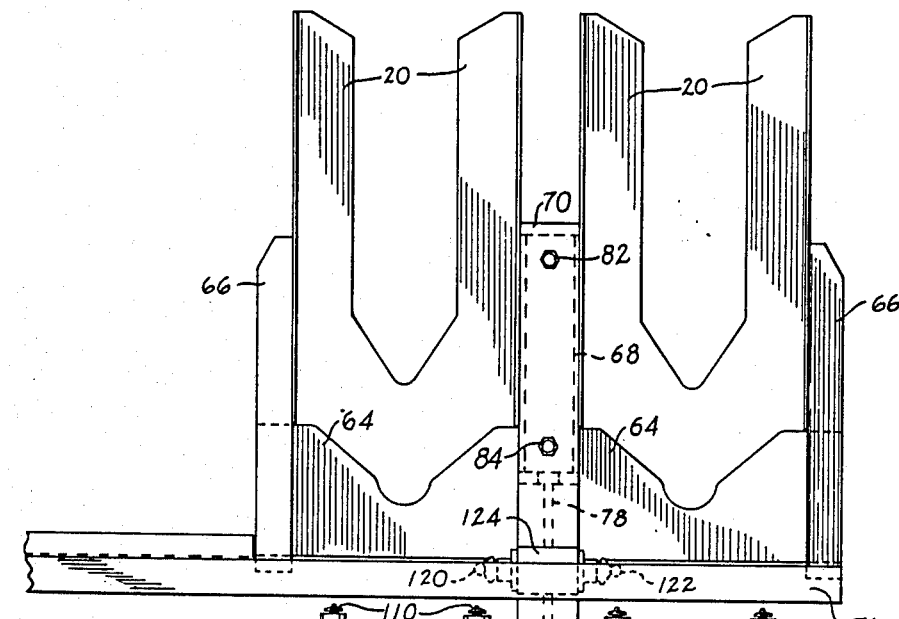
Fig. 5.
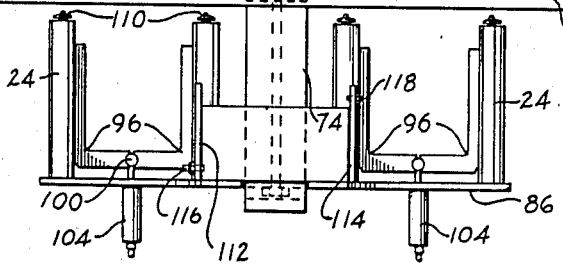
Fig. 4.
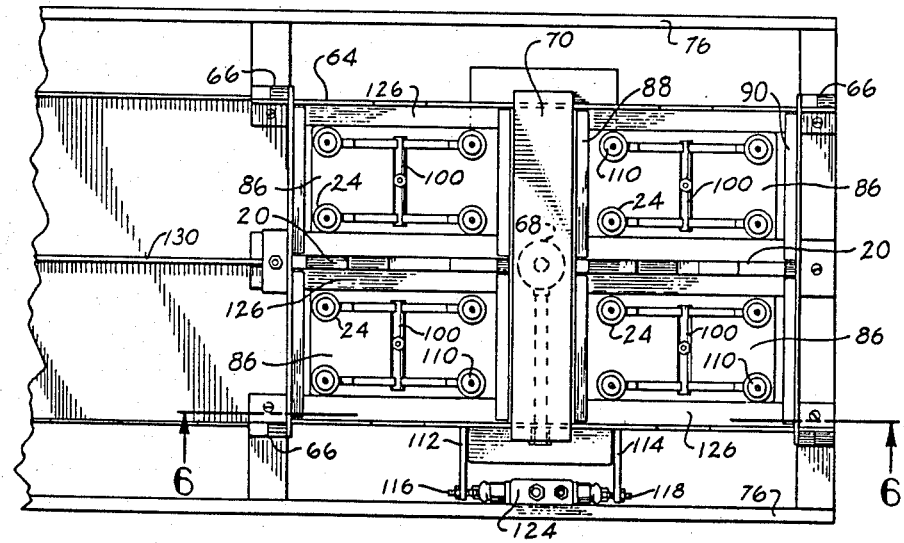

APPARATUS FOR SECURING CARTONS ON THE TOP OF ARTICLES CARRIED IN A CASE

This is a division of application Ser. No. 06/205,194, filed Nov. 10, 1980, now U.S. Pat. No. 4,392,586.

BACKGROUND OF THE INVENTION

In recent years articles such as bottles, have been secured with cartons in groups within a case. In one particular application, the case contains twenty-four bottles and four plastic cartons are forced down over the top of the bottles so that each of the cartons secures six bottles together. The cartons are provided with holes in a main body portion which are inserted over the tops or necks of the bottles and when pressed down over the bottles firmly grip the bottles and hold them in packages. Finger openings are also provided in the main body portion of the cartons so that the packages can be readily removed from the case. In most operations, the cases are cardboard boxes, however, they may be constructed of any conventional material such as plastic or wood.

Heretofore, the cartons were positioned in stacks adjacent one end of the machine and vacuum gripping devices were utilized for gripping two of the cartons simultaneously from two adjacent stacks onto a chute that carries the carton to the bottles. One problem with such vacuum devices is that sometimes a positive grip is not obtained and the cartons are dropped while they are being moved to the chute that carries them to the bottle, or are not pulled from the stack. Furthermore, if there is not a firm and positive gripping relationship between the vacuum mechanism and the carton, the carton would tend to slip relative to the vacuum cap and not be properly positioned when deposited on the chute. Many things could cause this problem, for example, when the vacuum caps begin to wear the reliability of the gripping action decreases.

After the plastic cartons have been positioned on top of the bottles carried within the case they have to be pressed down securely over the neck of the bottle in order to produce a secure package. In one particular machine a roller having recesses in its periphery is used for pressing the plastic cartons down over the top of the bottle. One problem encountered in this method is that if the roller is not properly positioned relative to the bottles carried in the case, the carton and in particular the portion of the carton extending around the end bottles, will not be pressed down over the bottles the entire extent and when the package is lifted, the loose bottles will drop out of the package.

SUMMARY OF THE INVENTION

The invention relates to an apparatus for positioning and inserting cartons over the necks of articles such as bottles as cases of the articles are moved along a conveyor. While in the drawings one particular carton now being utilized is illustrated, it is to be understood that the configuration of the carton itself may take many different forms.

The device includes an apparatus which feeds a plurality of cartons in succession from stacks of cartons. Spaced openings are provided between the main body portion of adjacent cartons provided in the stacks.

A support plate having a plurality of carton picking fingers is carried below the stacks of cartons. Outwardly extending projections are carried adjacent a top portion of the picker fingers. A power operated cylinder is provided for selectively moving the support plate to and from the stacks of cartons for inserting the plurality of picker fingers through openings in at least the last carton of each stack of cartons allowing the outwardly extending projections to be inserted in the space provided between the last carton of the stacks and the next to the last carton for separating the last or bottom cartons from the remainder of the cartons carried in the stacks.

As the support plate is lowered, the outwardly extending projections move laterally inwardly within the picker fingers allowing four cartons to be deposited in two rows on a feed chute.

The feed chute is inclined with a lower portion positioned directly over a moving conveyor. Cases of bottles containing in one particular embodiment, twenty-four bottles pass under the lower end of the feed chute. A pivotal retaining arm is provided adjacent the end of the feed chute for holding the lines of cartons on the feed chute. The pivotal arm also permits the two lowermost cartons provided on the feed chute to extend outwardly and down below the end of the feed chute so that as the case passes under the feed chute, the bottles provided in the moving case engage the leading edge of the lowermost cartons and pull two of the cartons from the two rows of cartons provided on the feed chute.

After the first two cartons are deposited over the leading twelve bottles in the case, the next two cartons provided on the feed chute engage the top portion of the fourth bottles provided in the case pulling two additional cartons down over the remaining twelve bottles of the case. When counting the bottles they should be counted for purposes of explanation, from the front of the case and they have four rows of six bottles.

The case with the four cartons positioned loosely on top of the twenty-four bottles is then transported by the conveyor under a presser foot. A switch is triggered by the case as it passes under the presser foot causing the presser foot to come down forcing the four cartons down over the necks of the bottles for positively securing the cartons on the bottles in four packages. Since the conveyor continues to move, the presser foot is provided with a movable plate which includes twenty-four positioning cups that moves along with the case during the pressing operation of the cartons over the necks of the bottles.

When the power operated cylinder is raised, a spring returns the presser plate back to its initial position so that it will be ready for engaging the next case of bottles.

To insure that the side walls of the case do not interfere with the dropping of the cartons from the end of the feed chute onto the tops of the bottles, a case opening mechanism is provided closely adjacent the bottom of the chute. This case opening mechanism includes opposed conical rollers that are carried on spring-loaded pivotal members that engage the side walls of the case as the case passes under the end of the feed chute forcing the side walls apart to insure that the cartons drop freely onto and over the tops of the bottles provided in the case.

Accordingly, it is an important object of the present invention to provide on apparatus for positioning cartons over articles carried in a case for securing the articles in packages.

Another important object of the present invention is to provide a simple and reliable apparatus for removing cartons from stacks of cartons.

Still another important object of the present invention is to provide a reliable and simple mechanism for feeding cartons in succession to cases carried on a moving conveyor and depositing the cartons on top of the articles.

Another important object of the present invention is to provide a means of applying cartons into cases that are full depth as well as cases that are less than full depth.

Still another important object of the present invention is to provide a mechanism for insuring that the cases are opened properly for receiving cartons.

Still another important object of the present invention is to provide an assembly for pressing cartons down over articles carried in a case for securing the articles in packages.

These and other objects and advantages of the invention will become apparent upon reference to the following specification, attendant claims and drawings.

BRIEF DESCRIPTION OF THE DRAWINGS

FIG. 1 is a side elevational view of a device for removing cartons from stacks of cartons and feeding the cartons to cases carried on a conveyor and subsequently pressing the cartons down over the articles carried in the conveyor, FIG. 2 is an enlarged perspective view illustrating the package of articles with a carton properly secured thereto, FIG. 3 is a perspective view of one particular carton that can be inserted on the articles, FIG. 4 is a plan view of FIG. 5.

FIG. 5 is an enlarged side elevational view of the apparatus for removing cartons from a plurality of stacks of cartons.

DESCRIPTION OF A PREFERRED EMBODIMENT

Figure 6:
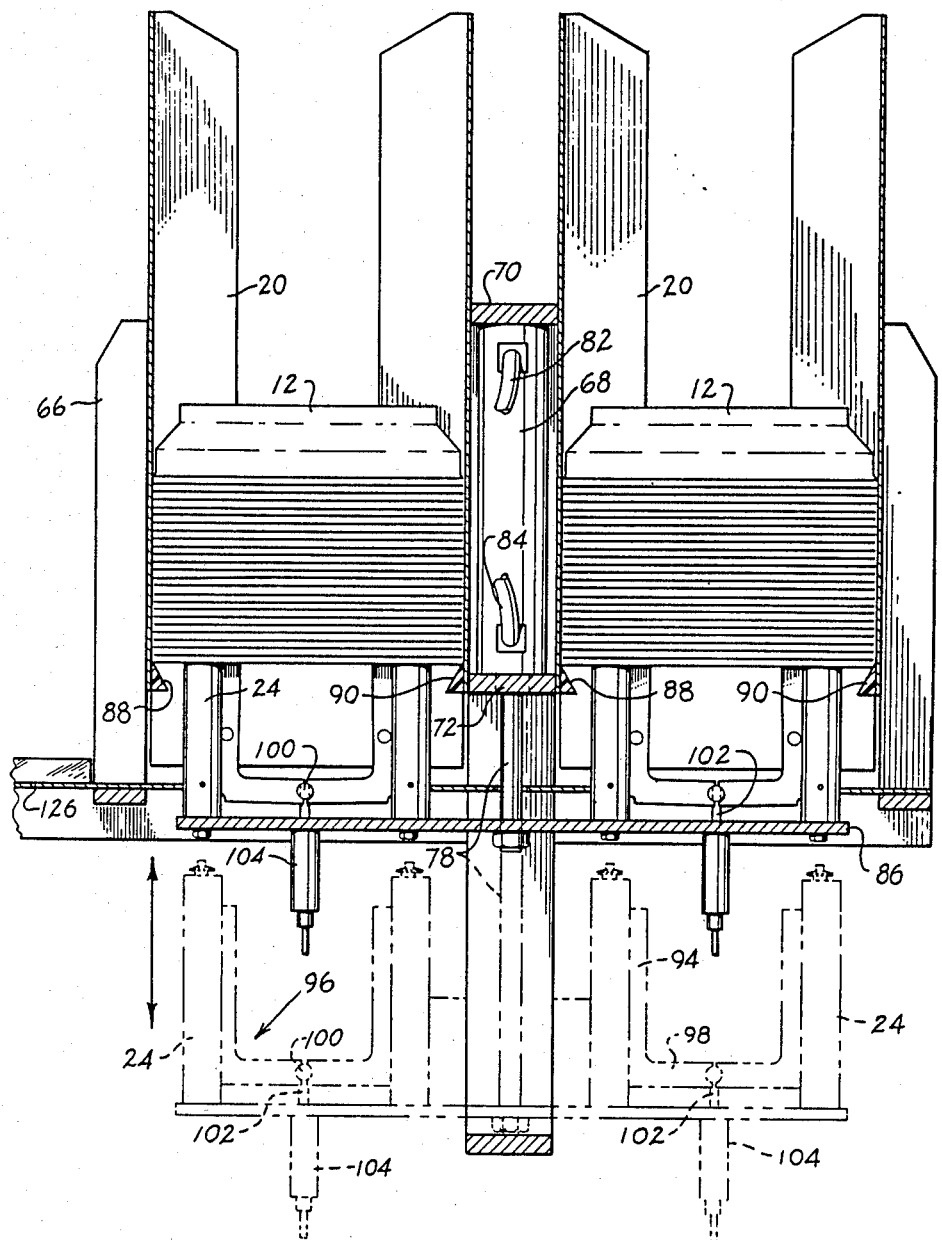
FIG. 6 is an enlarged sectional view taken along line 6—6 of FIG. 4.

Referring to FIG. 2, there is illustrated a package including six bottles 10 that have a plastic carton 12 pushed down over the necks thereof for securing the six bottles in a package. The carton 12 has a main body portion 14 and finger openings 16 which permit the package to be lifted. The cartons are loaded into four stacks 18 that are defined by vertically extending angle posts 20. Centrally positioned below the four stacks is a carton picker 22 that is utilized for removing the cartons four at a time from the four stacks. The details of the carton picker will be discussed more fully below. As the plastic cartons 12 are removed from the stacks 18, they are deposited on a feed chute 25 which is inclined downwardly. The cartons flow by means of gravity down to the end of the feed chute until they strike a pivotal arm 26 provided on the end of the feed chute.

Cases 28 loaded with articles such as bottles are fed under the feed chute 25. The case 28 is a cardboard case that has twenty-four bottles provided therein. As the case passes beneath the lower end of the feed chute 25, the lower edge of the foremost two cartons carried side-by-side on the feed chute 25, engage the front of foremost bottles in the case causing the two lead cartons to be withdrawn from the feed chute and dropped by gravity on top of the bottles.

The case continues to be shifted to the left on the conveyor 30 until the fourth bottle in the row of six engages the leading edge of the next adjacent cartons causing these two cartons to drop down on top of the case.

The case is moved forward to the left under a presser foot 32. As it passes under the presser foot 32 the front of the case strikes a switch arm 34 that in turn activates a microswitch. Upon activation of the microswitch the presser foot 32 is lowered by means of a pneumatic cylinder 36 forcing the four cartons simultaneously down over the tops of the bottles securing the twenty-four bottles provided in the case in four packages.

In order to insure that there is a separation between the case that has just passed under the presser foot 32 and the next case, a second conveyor 38 follows the first conveyor 30 and is driven at a higher rate of speed. Both of the conveyors 30 and 38 are driven off of any suitable electric motor 40 which has coupled to its output shaft a belt 42. The belt 42, in turn, wraps around the sprocket 44 carried on shaft 46. Another sprocket is provided on shaft 46 around which a conveyor belt 38 extends. The other end of the conveyor belt 38 extends around a sprocket or pulley 50 provided on shaft 52. The first conveyor 30 is driven off of shaft 52 by means of a belt 54 extending around a sprocket 50 and a larger sprocket 58 carried on a rotatable shaft 60.

The conveyor chain of the first conveyor 30 wraps around the shaft 60 and its other end extends around a pulley 62 provided adjacent the other end of the machine. As a result of the conveyor 38 running at a higher speed than the conveyor 30, when the case is transferred from the end of the first conveyor 30 onto the following conveyor 38, a space is provided between that case and the next following case. This permits the arm 34 associated with the microswitch that is used for activating the presser foot to move laterally inwardly in front of the next following case.

Referring in more detail to FIGS. 4, 5, 6, 7, and 8, there is illustrated in greater detail the carton pickers 22.

The cartons 12 are loaded in stacks and each stack is held in position by a pair of angled carton guides 20 that nest against the corners of the cartons. A side wall 64 is provided adjacent one end and other suitable side walls 66 are positioned on the outside. Any suitable carton guides could be utilized for holding the cartons in their respective stacks 18. Interposed centrally between the four stacks of cartons is a pneumatic cylinder 68 that is supported on suitable framing that includes a top plate 70 and a bottom plate 72. The top and bottom plates 70 and 72 are secured by bolting to vertically extending side plates 74 that are suitably secured to framing 76 through which the feed chute extends. It is to be understood that the pneumatic cylinder 68 is fixed in position and its piston 78 moves in and out of the lower end of the cylinder 68. Fluid lines 82 and 84 are connected to upper and lower ports of the double-acting cylinder 68.

The lower end of the piston 78 is, in turn, secured to a support plate 86 upon which the picker fingers 24 are carried.

As shown in FIG. 6, the bottoms of the stacks are open and the cartons are supported on angle abutments 88 and 90 carried on the opposed walls of the guides 20.

Mounted on the support plate 86, forming part of the carton pickers are as illustrated in FIG. 4 sixteen picker fingers 24. These picker fingers have vertically extending slots 92 provided in the inner wall thereof. Positioned in the vertically extending slots 92 is a vertically extending portion 94 of an L-shaped member, generally designated by the reference character 96. A horizontally extending portion 98 of the L-shaped member 96 is, in turn, journaled on a horizontally extending shaft 100. The shaft 100 is carried on the outer end of a piston rod 102 that extends out of a double-acting pneumatically cylinder 104 which is spring loaded on one side.

Figure 7:
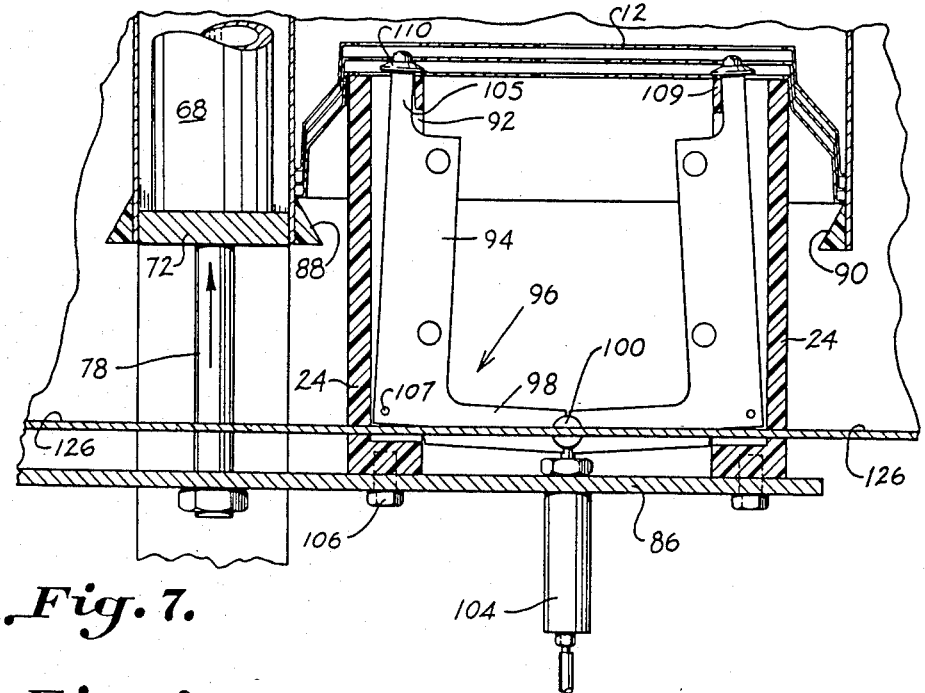
FIG. 7 is an enlarged sectional view illustrating the picker fingers engaged between the bottom and next to the bottom carton of the stack.

As shown in FIG. 7, at the juncture of the vertically extending portion 94 and horizontally extending portions 98 of the L-shaped member 96, a pivot pin 107 extends for pivotally connecting the L-shaped member to a lower portion of the cylindrical picking finger 24. The bottom of the picking fingers 24 are secured to the support plate 86 by any suitable means such as a bolt 106.

Figure 8:
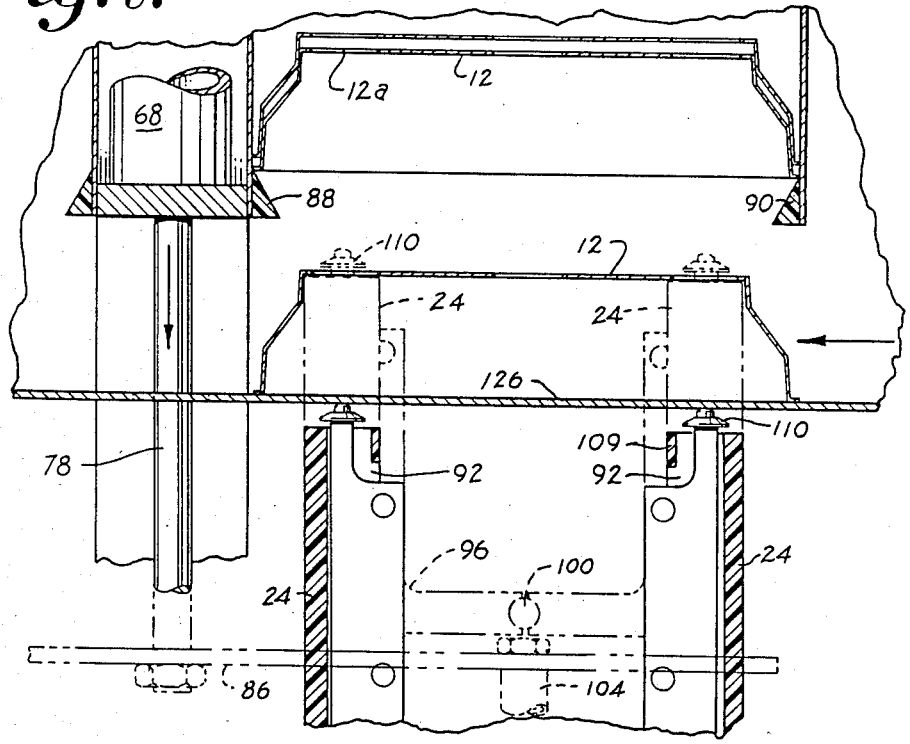
FIG. 8 is an enlarged sectional view illustrating the position of the picker fingers as the carton is deposited on the feed chute.

As shown in FIGS. 7 and 8, a top portion 105 of the vertically extending member 94 is removed so that it can project out of the upper end of the cylindrical finger 24. There is a cylindrical portion 109 adjacent the top of the finger 24 which limits the lateral movement of the L-shaped member 96. Secured to the top of the L-shaped member 96 is an outwardly extending projection 110 which in the particular embodiment illustrated in FIGS. 6–8 is in the form of a disk. As a result of the L-shaped member 96 being pivotally mounted at pivot point 107, the projection can be shifted laterally from a position such as shown in FIG. 8, where it is in axial alignment with the finger 24 to a position such as shown in FIG. 7, wherein it extends in between the lowermost carton 12 in the stack and the next carton 12 in the stack.

In operation, in order to remove four of the cartons 12 simultaneously from the four stacks of cartons carried between the carton guides 20, a valve, which will be discussed more fully later, is activated causing air to flow in the bottoms portion 84 of the pneumatic cylinder 68. The support plate upon which the picker fingers are carried, is raised from the phantom line position shown in FIG. 6 upwardly to the full line position wherein the disk-like projections 110 project through the openings 12a provided in the cartons.

A pair of opposed brackets 112 and 114 are carried by the support plate such as illustrated in FIG. 5, and each has an outwardly extending bolt 116 and 118 provided thereon. It is noted that the bolt 118 is carried adjacent the top of the bracket 114 and the bolt 116 is carried adjacent the bottom of the bracket 112. The purpose of the bolts 116 and 118 are to strike contact element 120 and 122 provided on a pneumatic switch 124 for controlling the flow of air to the pneumatic cylinders 104 extending out of the bottom of the support plate 86.

When the contact switch 120 is engaged by the bolt 116, after the support plate has been raised to the position shown in full lines in FIG. 6, pressurized air is removed from cylinders 104 and a spring carried in the cylinders causes the cylinders 104 to pull the centrally located shaft 100 downwardly as shown in FIG. 7. This pivots the L-shaped members and the disk-shaped projections 110 are shifted laterally so that the bottom of the disk-shaped projection 110 extends over the edge portion of the cartons surrounding the opening 12a.

After a predetermined period of time controlled by a timing device, the air is then supplied to the top port of the cylinder 68 causing the support plate to be lowered.

As the support plate with the fingers 24 provided thereon is lowered, the projections 110 pulls the lowermost carton of each of the four stacks downwardly over the inclined abutments 88 and 90 allowing the lowermost cartons to drop onto the feed chute 126. Furthermore, as the support plate 86 is being lowered, the bolt 118 as shown in FIG. 5, strikes the contact element 122 of the pneumatic switch 124 causing pressurized air to be supplied to the cylinder 104 to raise the inner end of the horizontal portion 98 of the L-shaped arm 96 pivoting the disk 110 back to their retracted position such as shown in FIG. 8 wherein they are in alignment with the finger 24. This enables the disk to be withdrawn down through the openings 12a in the cartons as the cartons rest on the feed chute 126.

The pneumatic cylinder 68 which raises and lowers the support plate 86 for removing the cartons from the stacks is under the control of the switch arm 34 positioned under the presser foot 32. As a result, each time the presser foot 32 is lowered for pressing four of the cartons down over the necks of the bottles carried in the case passing therebelow, four additional cartons are removed from the stacks and supplied to the feed chute. A timer is provided in the circuit associated with the switch 108 so that the presser foot is raised after a predetermined period of time and the support plate 86 is lowered after a predetermined period of time. This eliminates the necessity of having a second switch for reversing the flow of air to the cylinder associated with the presser foot and the cylinder 68 associated with the support plate 86.

Figure 10:
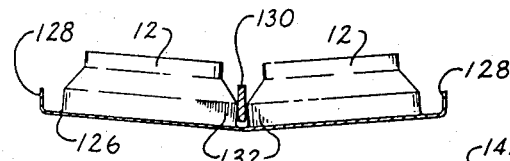
FIG. 10 is a sectional view taken along 10—10 of FIG. 9.

The cartons 12 slide down the feed chute 126 as a result of gravity to the lowermost end of the chute which is positioned closely adjacent the top of the cases carried on the conveyor 30 as shown in FIG. 1. It is noted that the feed chute diverges upwardly toward the side walls slightly as shown in FIG. 10, so that the cartons will be maintained adjacent the center of the feed chute and when they drop off of the feed chute onto the articles carried therebelow they will not engage the edge of the case and they are properly positioned relative to the bottles carried in the case. The feed chute 126 has inclined walls 128 provided on the outer edge thereof for insuring that the cartons 12 do not slide thereoff. Also, a divider plate 130 extends down the center of the feed chute for maintaining the cartons 12 separated. As is evident from looking at FIGS. 10 and 11, the innermost forward corner generally designated by the reference character 132 of the carton 12 is lower than the outer corners of the carton. As a result, when the cartons reach the end of the chute the forward inner corners of the cartons will be lower than the outer corners so that they will engage the two center rows of bottles in the case and be pulled off. This insures that the cartons are properly positioned over the bottles. Another advantage of inclining the feed chute 126 towards the center is that it causes the cartons to remain very close. If they were flat, occasionally they would tend to ride to the outside wall 128 of the feed chute, and as a result the outer edges of the cartons could possibly rest on the outer edges of the case passing therebelow.

Figure 9:
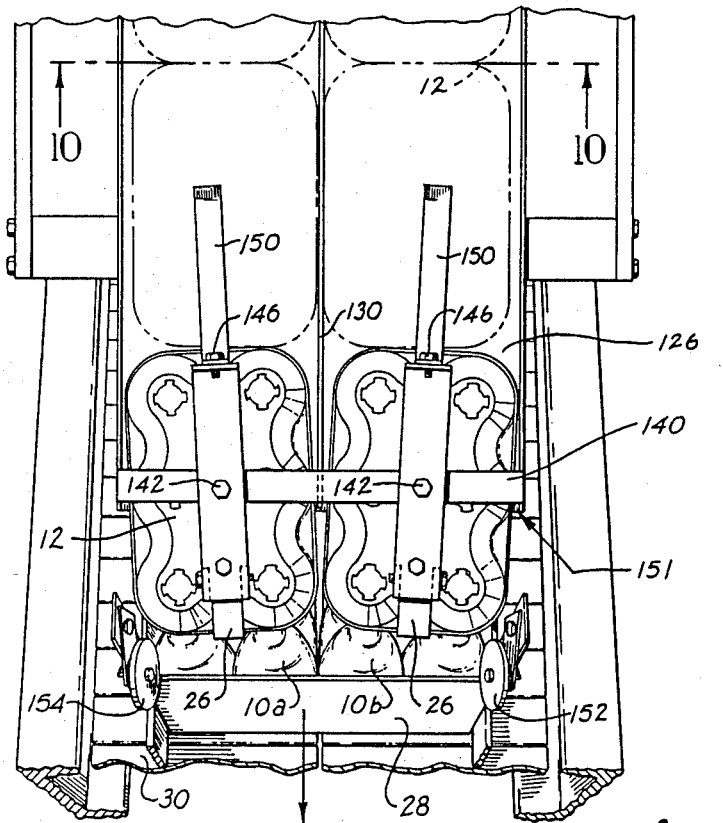
FIG. 9 is a perspective view taken from the top illustrating the feed chute delivering the cartons to the case.
Figure 11:
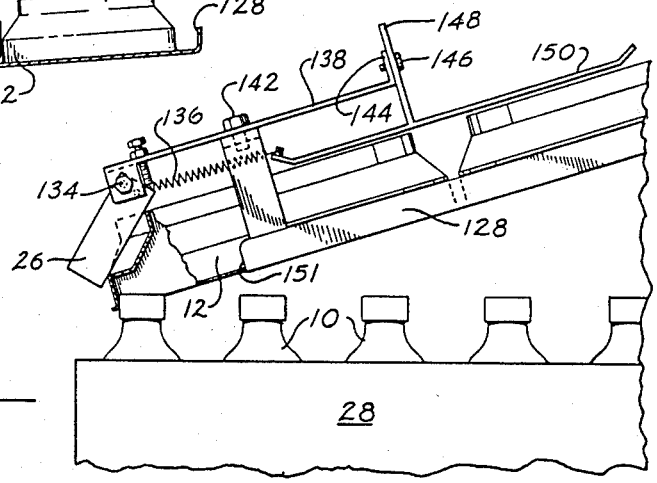
FIG. 11 is a fragmentary side elevational view illustrating the carton being deposited on the article carried in the case.

At the end of the carton feed chute 126 referring to FIGS. 1, 9 and 11, there are retaining means 26 that takes the form of pivotally mounted elongated blocks which are inclined to the end of the chute 126. The block 26 is pivoted on bolt 134 and has a spring 136 attached thereto pulling the block 26 towards the vertical position. As a result, when the cartons 12 slide down the carton feed chute 126, the foremost two cartons strike the pivotal arms 26 and stay in the carton chute until they are pulled therefrom by a leading bottle 10 carried in a case passing thereunder such as shown in FIG. 11. The pivotal stops 26 as previously mentioned are carried on a bolt 134 that is, in turn, supported on an inclined adjustable bracket 138. The inclined bracket 138 is supported on a cross-bracket 140 and is secured thereto by means of a bolt 142. The upper end of bracket 138 has a flange 144 provided thereon through which a bolt 146 passes securing such to a vertically extending flange 148.

An adjustable skid plate 150 is supported by the vertically extending flange 148 and is provided for engaging the tops of the cartons 12 as they pass down the feed chute 126. All of the components shown in FIG. 11 forming the bracket are supported on the cross-bracket 140. As a result of the foot being adjustable by manipulating the bolt 146 various size and height cartons 12 can be utilized. A slot is provided in the vertical bracket 148 to allow the foot 150 to be adjusted vertically. It is noted that the spring 136 is anchored to the lower end of the foot 150.

From looking at FIGS. 9 and 11 it can be seen that the feed chute 126 terminates over the conveyor at the point 151 and the two lowermost cartons extend downwardly below the ends of the feed chute so that as the case of articles 28 passes therebelow, the bottles 10a and 10b engage the inside inner corner of the two foremost cartons pulling the cartons down against the retaining means 26 allowing the cartons to drop on the first twelve bottles carried in the case. After the first two cartons are deposited on the first twelve bottles of the case, the next two cartons slide down the feed chute and are engaged by the fourth bottles in each row counting from the direction of flow of the case and drop over the tops of the last twelve bottles in the case. These four cartons 12 then rest on top of the twenty-four bottles and the conveyor 30 continues in the forward direction shifting the case with the four cartons thereon forward to the presser foot 32.

Figure 12:
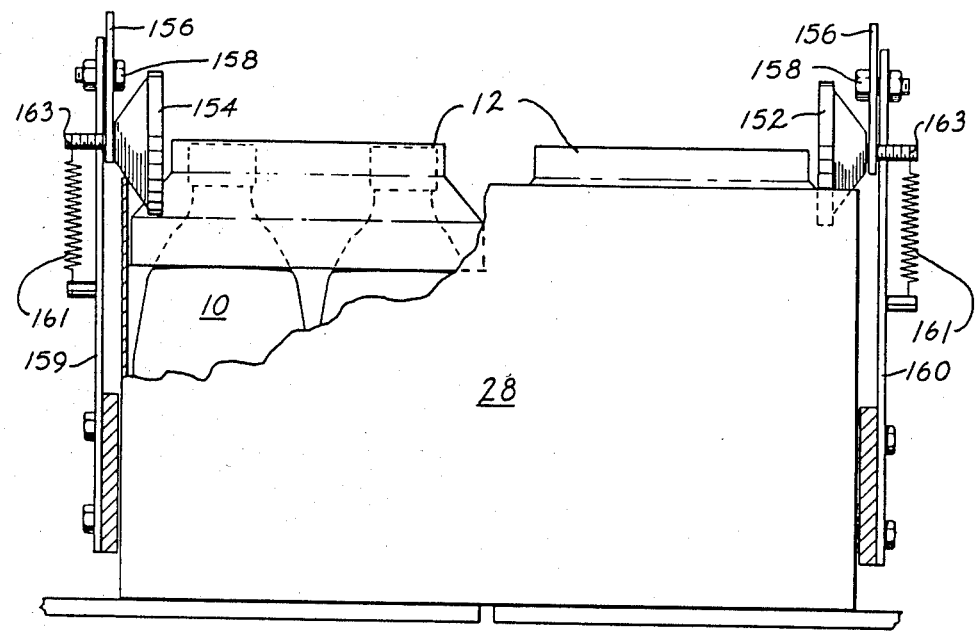
FIG. 12 is a sectional view extending through the conveyor illustrating a mechanism for insuring proper opening of the case.
Figure 13:
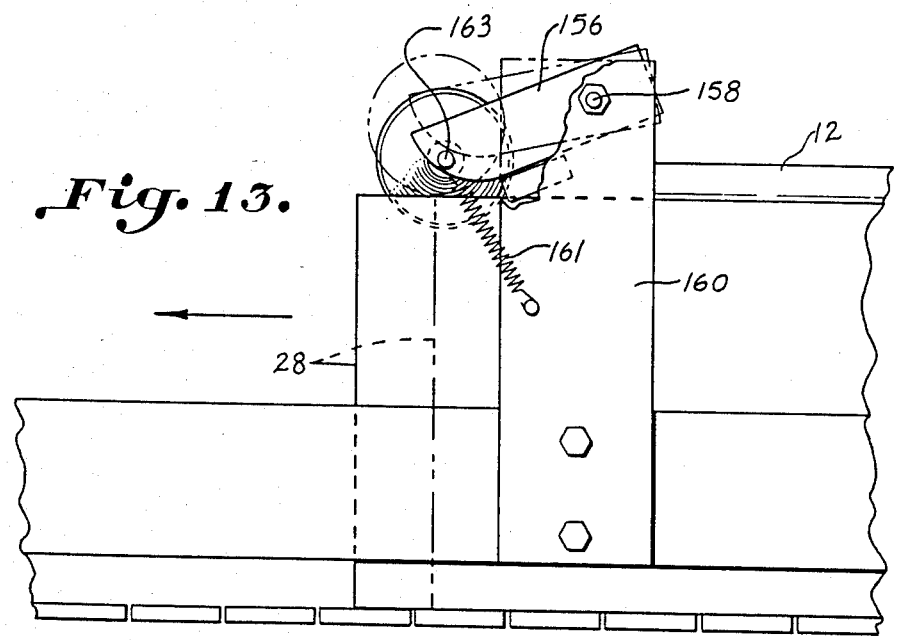
FIG. 13 is a side elevational view of the device shown in FIG. 12.

In order to insure that the side walls of the case 28 are properly extended, pivotally supported conical shaped rollers 152 and 154 are positioned adjacent the side walls of the case so that the inclined surfaces of the rollers 152 and 154 engage the top edge of the case as shown in FIG. 12 pulling the top edge substantially vertical so that the cartons 12 can drop properly into the case. The inclined rollers 152 and 154 are, in turn, supported on a pivotal arm 156 that is permitted to pivot about bolt 158 carried on vertically extending bracket 159. A spring 161 extends between the vertical bracket 160 and a shaft 163 which supports the rollers 152 and 154 tending to pull the rollers vertically downwardly.

Figure 14:
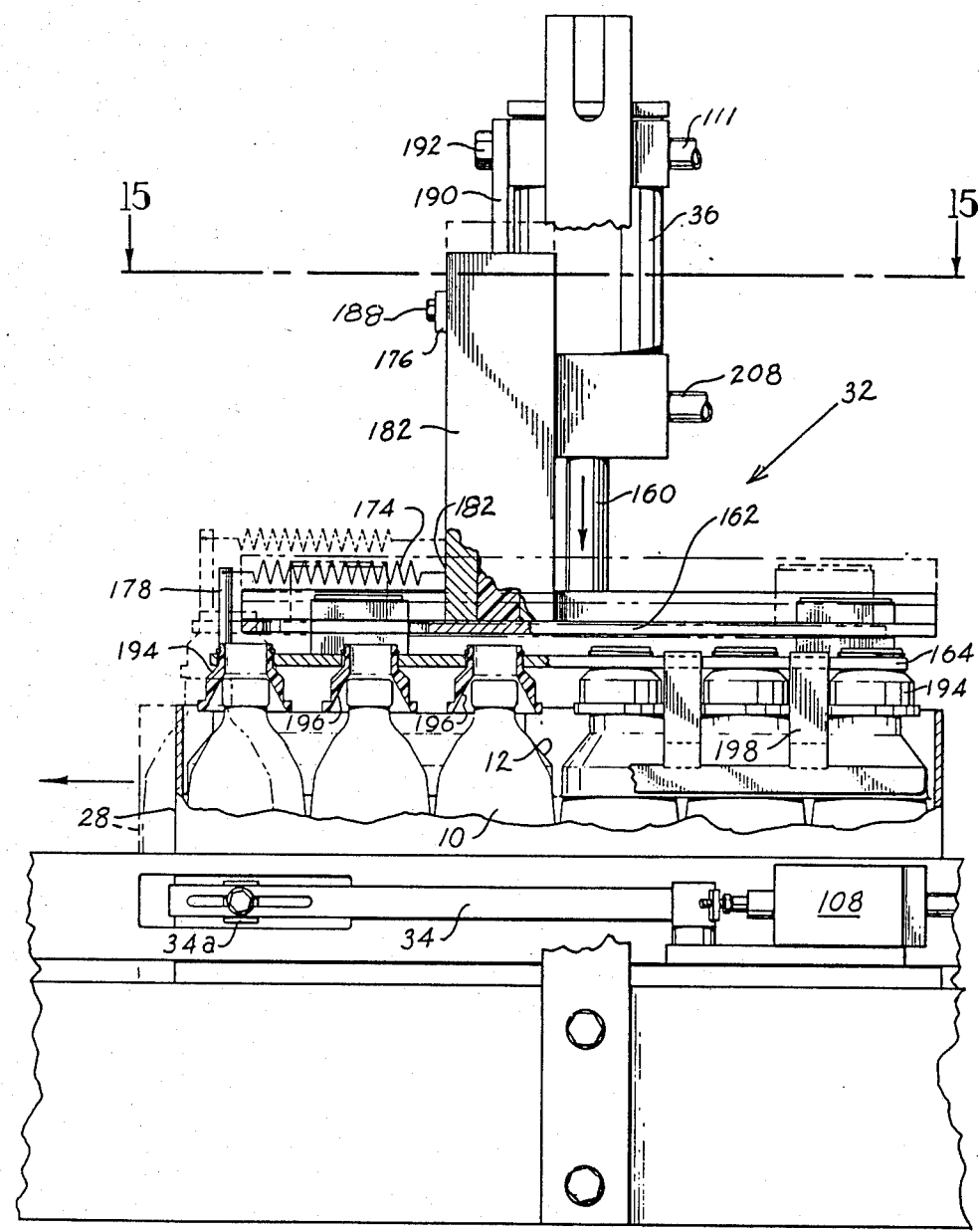
FIG. 14 is a side elevational view partly in section and with parts broken away illustrating a presser foot forcing the cartons down on the bottles carried within a case.
Figure 15:
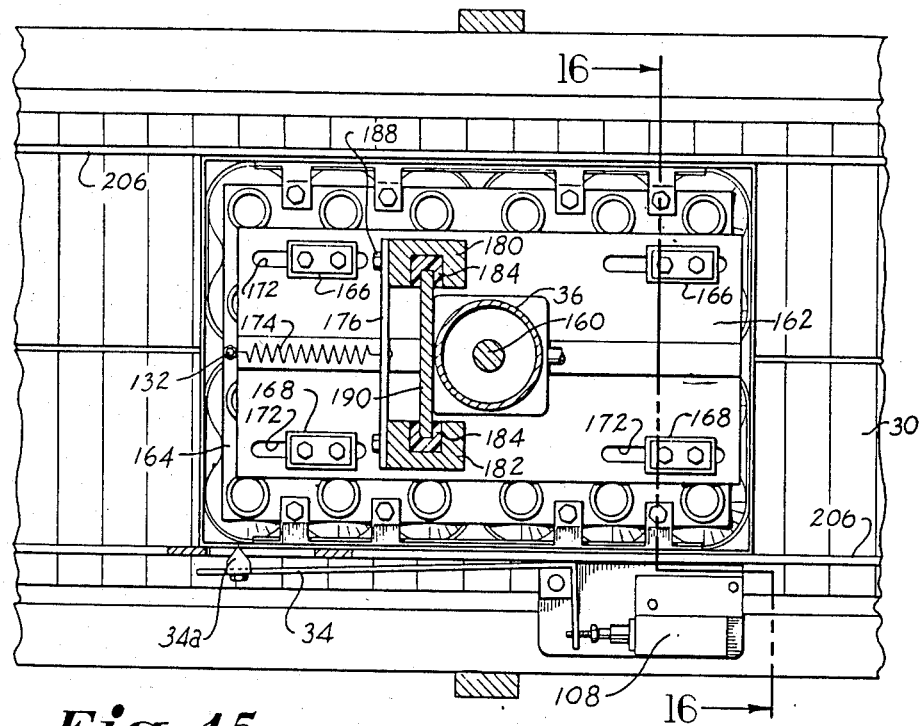
FIG. 15 is a plan view taken along line 15—15 of FIG. 14.
Figure 16:
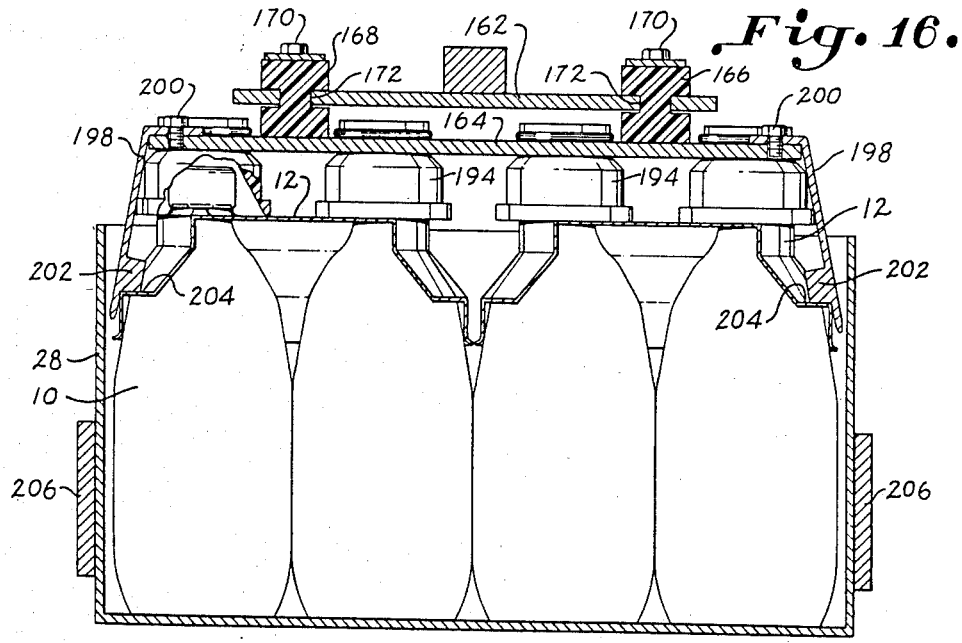
FIG. 16 is a front elevational view taken in section along line 16—16 of FIG. 15.

Referring to FIGS. 14, 15, and 16, there is disclosed in detail the presser foot 32 which presses the four cartons down over the necks of the bottles 10 for securing the cartons thereon. As the case 28 passes beneath the presser foot, the leading edge of the case strikes the adjustable contact 34a causing the contact arm 34 to pivot to the position shown in FIG. 15 laterally of the case. When the contact arm 34 is pivoted outwardly it, in turn, activates a microswitch 108. The microswitch opens a solenoid valve allowing pressurized air to be supplied to the top port 111 of the pneumatic cylinder 36. When air is supplied through the top port 111 of pneumatic cylinder 36, it causes a piston 160 to be extended out of the bottom of the cylinder lowering the presser plate. The bottom of the piston is connected to a rectangular plate 162. Positioned directly below the rectangular plate 162 is a longitudinally movable plate 164. A slidable connection is provided between the rigid plate 162 and the movable plate 164. Blocks 166 and 168 are secured to the movable plate by means of bolts 170. Elongated longitudinally extending slots 172 are provided in the blocks 166, and 168 so that slots 172 provided in the upper plate 162 permit a certain degree of longitudinal movement between the lower plate 164 and the top plate 162. As can be seen in FIG. 14, the lower plate can move after it engages the bottle during the pressing of the cartons 12 over the neck of the bottles from the full line position to the phantom line position. A spring 174 extends between a vertically extending plate 176 that is carried on the top plate 162 and a post 178 connected to the lower plate for returning the lower presser plate 164 back to its initial position after the presser foot has been raised. The purpose of providing this longitudinal movement is to allow the case 28 to continue moving on the conveyor as the pressing of the carton takes place.

The entire presser foot moves vertically within the vertically extending guide posts 180 and 182. Nylon vertically extending bearing surfaces 184 are carried by the posts 180 and 182. The vertical posts 180 and 182 are, in turn, secured to the cross plate 176 by bolts 188. A vertically extending guide plate 190, such as illustrated in FIG. 14, is secured by a bolt 192 to a framing that, in turn, is fixed to the cylinder 36 and supports the cylinder 36.

As a result, as the piston 160 of the cylinder 36 is extended and retracted the posts 180 and 182 ride up and down on the vertical plate 190. The posts 180 and 182 are, in turn, fixed to the top plate 162.

The presser plate 164 has twenty-four cups 194 carried therein which have inclined conical surfaces 196 provided therein with an open top. As a result when the presser foot 164 is lowered down for pressing the cartons 12 over the tops of the bottles 10 carried in the case 28, if any of the bottles are out of alignment the inclined surfaces 196 will properly position the bottles for pressing the cartons 12 over the neck as shown in FIGS. 14 and 16. Downwardly extending side brackets 198 are carried on the sides of the lower plate 164 and are secured thereto by means of bolts 200 which extend through a horizontal flange associated with the brackets 198. Positioned adjacent a lower end of the brackets 198 are inwardly protruding dogs 202. These dogs engage a lip 204 provided adjacent a lower end of the cartons 12 for aiding in properly positioning the cartons relative to the bottles. The dogs 202 engage the flanges 204 of the cartons prior to the centering cups 194 engaging the cartons. As seen in FIGS. 15 and 16 spaced guide plates 206 are provided over the top of the conveyor 30 for engaging the side walls of the case for insuring proper positioning of the case.

Figure 17:
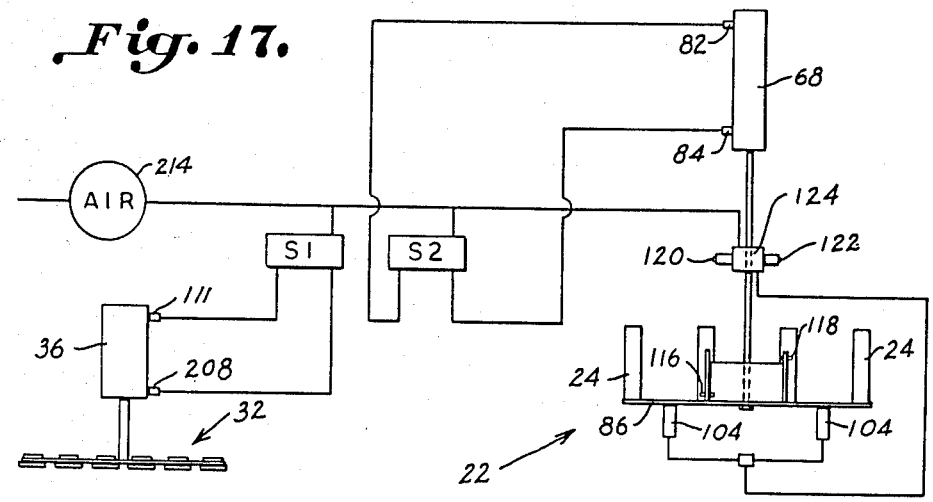
FIG. 17 is a schematic diagram illustrating the air flow for controlling the pneumatic cylinder utilized with the machine.
Figure 18:
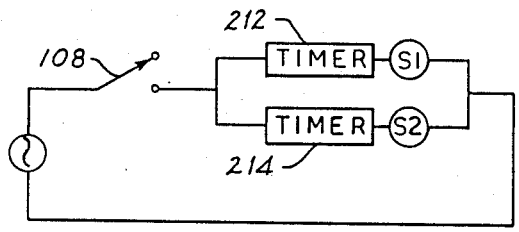
FIG. 18 is a schematic diagram illustrating the electrical controls for the machine.

In summarizing the operation of the presser foot the leading edge of the case strikes contact 34a of arm 34 activating microswitch 108. Upon activation of microswitch 108 air is supplied to the top of the cylinder 36 causing the entire presser foot to be lowered. The dogs 202 first engage the flanges 204 provided on the cartons properly positioning the carton relative to the bottles. The centering cups 194 then engages the main body 14 of the cartons forcing the neck of the bottles through the openings provided in the top of the carton. The pressure coupling between the cartons and six of the bottles produces four secure packages of bottles within the case wherein they can be readily lifted from the case. While the cartons are being pressed over the necks of the bottles since the case is moving on the conveyor 30, the lower presser plate 164 moves forward with the case against the tension of spring 174. This is a relatively short distance controlled by the length of the slot 172. In the embodiment illustrated, the maximum length of the travel is approximately one and one-half inches. Immediately after the presser foot has pressed the tops on the bottles a timer times out causing air to be supplied to a lower port 208 of the cylinder 36 which raises the presser foot back to its initial position. It is to be understood, of course, that limit switches could be utilized in place of the timer for controlling the up and down movement of the cylinder 36. Any suitable control circuit could be utilized. As shown in FIGS. 17 and 18 solenoid valve S1 is associated with the cylinder 36 for controlling the flow of air to and from the two ports 111 and 208 whereas solenoid valve S2 is associated with cylinder 68 for removing the cartons from the stacks of cartons. Timers 212 and 214 are connected in series with the solenoid valves S1 and S2 for causing air to be supplied through the lower ports 208 and 84 of the cylinders 36 and 68, respectively, for raising the presser foot 32 and the carton picker 22 after a predetermined period of time.

Air may be supplied from any suitable source such as illustrated at 214.

The small pneumatic cylinders 104 associated with the carton picker 22 are spring loaded so that upon tripping of the air valve 120 by the contact 116 as the support plate 86 is raised, pressurized air is removed from the bottom of the cylinders 104 and a spring provided in cylinder 104 causes the projections 110 to be moved laterally for engaging the top side of the lowermost carton 12 provided in the stacks. As the support plate 86 is lowered the bolt 118 strikes contact 122 allowing air to be supplied to the picker cylinders 104 and the cylinders return the projections back to their initial position in alignment with the picker fingers 24.

While a preferred embodiment of the invention has been described using specific terms, such description is for illustrative purposes only, and it is to be understood that changes and variations may be made without departing from the spirit or scope of the following claims.

What is claimed is:

1. An apparatus for placing a plurality of cartons over the tops of articles carried in a case on a moving conveyor comprising:
   a presser foot positioned directly over said moving conveyor at a height for permitting said cases with said articles provided therein to pass thereunder;
   a power operated cylinder operably connected to said presser foot for selectively lowering said presser foot for forcing said cartons on said articles and for raising said presser foot;
   means for activating said power operated cylinder responsive to a case being positioned directly below said presser foot causing said presser foot to be lowered down on said cartons carried on top of said articles in said case;
   said presser foot including,
   (i) a movable presser plate,
   (ii) apertures provided in said movable presser plate adapted to extend over the tops of said articles carried in said case positioned below said presser foot,
   (iii) means for permitting said presser plate to move longitudinally in the direction of travel of said case and conveyor when said presser plate is forcing said cartons down over the top of said articles for securing said cartons to a group of said articles carried in said case, and
   (iv) means for returning said presser plate back to its initital longitudinal position responsive to said power operated cylinder raising said presser foot.

2. The apparatus as set forth in claim 1 further comprising:
   an upper plate connected to a piston extending out of said power operated cylinder; and
   coupling means provided between said upper plate and said presser plate permitting longitudinal movement therebetween.

3. The apparatus as set forth in claim 1 further comprising:
   centering cups carried in said apertures provided in said presser foot.

4. An apparatus for feeding cartons from a plurality of stacks of cartons in groups for being placed on articles carried in a case, spaced openings provided in a main body portion of said cartons for receiving articles, and a conveyor feeding cases of said articles in succession, said apparatus comprising:
   (a) an inclined feed chute positioned above said conveyor with a lower end thereof terminating closely adjacent said top of said cases carried on said conveyor;
   (b) means for successively removing a bottom carton from each of said stacks and loading said cartons on said feed chute adjacent an upper end;
   (c) retaining means carried adjacent a bottom end of said feed chute for holding said cartons on said feed chute until the lowermost cartons on said chute are pulled off said chute when engaged by an article carried in a moving case passing under the lower end of said chute;

(d) a pressor foot carried above said conveyor forward of the lower end of said feed chute;

(e) power operated means connected to said presser foot for pressing said cartons down over the tops of said articles as they pass under said presser foot;

(f) said presser foot including:
(i) a first plate connected to said power-operated means;
(ii) a second plate slidably carried by said first plate;
(iii) article positioning members carried by said second plate for extending over the tops of said articles as said presser foot forces said carton over said articles;
(iv) said second plate being slidably mounted relative to said first plate for moving with said cases when said carton is being forced over said articles, and
(v) means for returning said second plate to its original initial position upon said power-operated means lifting said pressure foot off said articles.

5. The apparatus as set forth in claim 4 further comprising:
said retaining means including;
(i) a pivotal member positioned forward of the end of said feed chute engaging a leading edge of said lowermost carton, with a lower portion of said leading edge extending below said feed chute, whereby said articles carried in a case passing under the lower end of said feed chute engages said lower portion of an inner wall of said leading edge of said lowermost carton withdrawing said carton from said feed chute.

6. The apparatus as set forth in claim 4 further comprising:
a second conveyor means positioned forward of said first conveyor and closely adjacent a leading end of said first conveyor;
means for driving said second conveyor at a faster rate than said first conveyor causing a gap to be produced between a case transferred to the second conveyor and the next following case.

7. An apparatus for feeding cartons from a plurality of stacks of cartons in groups for being placed on articles carried in a case, spaced openings provided in a main body portion of said cartons for receiving articles, and a conveyor feeding cases of said articles in succession, said apparatus comprising:

(a) an inclined feed chute positioned above said conveyor with a lower end thereof terminating closely adjacent said top of said cases carried on said conveyor;

(b) means for successively removing a bottom carton from each of said stacks and loading said cartons on said feed chute adjacent an upper end;

(c) retaining means carried adjacent a bottom end of said feed chute for holding said cartons on said feed chute until the lowermost cartons on said chute are pulled off said chute when engaged by an article carried in a moving case passing under the lower end of said chute; and (d) means carried adjacent a lower end of said feed chute forcing side walls of said case outwardly insuring said case is properly opened for receiving said cartons.

* * * * *